US011587026B2

(12) United States Patent
Lober

(10) Patent No.: US 11,587,026 B2
(45) Date of Patent: Feb. 21, 2023

(54) RFID BASED INVENTORY SYSTEM AND METHOD

(71) Applicant: Allied Inventory Systems, Inc., McKinney, TX (US)

(72) Inventor: Neal Jason Lober, Dallas, TX (US)

(73) Assignee: Allied Inventory Systems, Inc., McKinney, TX (US)

( * ) Notice: Subject to any disclaimer, the term of this patent is extended or adjusted under 35 U.S.C. 154(b) by 506 days.

(21) Appl. No.: 16/456,837

(22) Filed: Jun. 28, 2019

(65) Prior Publication Data

US 2020/0410432 A1 Dec. 31, 2020

(51) Int. Cl.
| | |
|---|---|
| *G06Q 10/08* | (2012.01) |
| *G06F 8/65* | (2018.01) |
| *G06K 7/10* | (2006.01) |
| *G06K 19/07* | (2006.01) |
| *G06Q 10/087* | (2023.01) |
| *G06K 19/077* | (2006.01) |

(52) U.S. Cl.
CPC ............ *G06Q 10/087* (2013.01); *G06F 8/65* (2013.01); *G06K 7/10099* (2013.01); *G06K 19/07773* (2013.01)

(58) Field of Classification Search
CPC .... G06Q 10/087; G06F 8/65; G06K 7/10099; G06K 19/07773
See application file for complete search history.

(56) References Cited

U.S. PATENT DOCUMENTS

| | | | | | |
|---|---|---|---|---|---|
| 7,382,260 | B2 * | 6/2008 | Agarwal | ............. | G06Q 10/087 340/568.4 |
| 7,513,425 | B2 * | 4/2009 | Chung | ............... | G08B 13/2477 235/382 |
| 7,680,691 | B2 * | 3/2010 | Kimball | ............... | G06Q 10/087 340/572.1 |
| 8,077,041 | B2 | 12/2011 | Stern | | |
| 8,321,302 | B2 | 11/2012 | Bauer | | |
| 9,665,848 | B1 * | 5/2017 | Johnson | ............ | G08B 13/2417 |
| 2008/0027835 | A1 * | 1/2008 | LeMasters | ........... | G06Q 10/087 705/28 |
| 2008/0104010 | A1 * | 5/2008 | Subramanian | ....... | G06K 7/0095 |
| 2010/0070966 | A1 * | 3/2010 | Perng | ........................ | G06F 8/60 717/173 |
| 2016/0078264 | A1 | 3/2016 | Armstrong | | |
| 2018/0293535 | A1 | 10/2018 | Christopher | | |
| 2018/0336516 | A1 | 11/2018 | Johnson | | |

OTHER PUBLICATIONS

Owunwanne, Radio Frequency Identification (RFID) Technology: Gaining a Competitive Value Through Cloud Computing, International Journal of Management & Information Systems—Fourth Quarter 2010 vol. 14, No. 5, Littleton, United States.

* cited by examiner

*Primary Examiner* — Paul Danneman
(74) *Attorney, Agent, or Firm* — Clark Hill PLC

(57) ABSTRACT

An inventory management system and method using RFID tags for the tracking and management of individual items of inventory or work-in-process. The system uses a cloud-based service device to manage inventory at a facility via a communications hub. RFID printers, RFID readers, and antennas located at the facility relay information through the communications hub. Movement of items is monitored by tracking RFID tags associated with each item. Information on the tracked items may be recorded, displayed, and used to generate reports and notifications by the cloud-based services device. Historical tracking records may also be displayed.

3 Claims, 10 Drawing Sheets

RFID BASED INVENTORY SYSTEM AND METHOD

The present invention generally relates to inventory management. More specifically, the present invention relates to RFID based management of inventory involving finished and unfinished products.

BACKGROUND OF THE INVENTION

Radio Frequency IDentification (RFID) tags have been used for decades to track products as they are moved into and out of inventory. RFID tags can be cheaply produced and affixed to products that are later stored for future use or sale. RFID based inventory management is often performed in warehouse operations and distribution centers to track to quantities of products on hand.

Inventory management often includes obtaining RFID tags that are physically associated with products. The identification information is stored in a database server on site and control software on the database service manages inputs from RFID readers physically located where the products are stored or distributed. RFID tags are read by the readers and there information can be transmitted to the database server via a transmitter associated with the RFID reader.

A shortcoming of current RFID inventory systems is the need to have a database server with control software that is configured by the user. Servers and databases need to be purchased and set up to manage the inventory. If the database server is off site, a virtual private network (VPN) may need to be set up to protect data integrity and privacy.

Another shortcoming of current RFID inventory systems is that inventory items are not restricted from entering or leaving specific locations.

Another shortcoming of current RFID inventory systems is that inventory items remain static throughout their tracked lifespan.

Therefore, there exists a heretofore unmet need in the art of inventory management that provides an RFID based inventory management system that reduces cost and equipment set up burdens on the user, provides measures for restricting the movement of inventory items, and accommodates the transformation of inventory items over their lifespan.

SUMMARY OF THE DISCLOSURE

The present invention is a system and method for inventory management. Specifically, tracking inventory items, whether static or dynamic, using a cloud-based control system that provides alerts or other measures of restricting the movement of inventory items.

One embodiment of the present disclosure is an RFID based inventory system including a cloud-based services device; a communications hub linked to the cloud-based services device via the Internet; one or more RFID readers in communication with the communications hub; and one or more antennas in communication with the one or more RFID readers, where each of the one or more antennas is uniquely associated with one of the one or more RFID readers, and where each of the one or more RFID readers is configured to interrogate RFID tags through its associated antenna. The system may also include an RFID printer. One or more of the RFID readers may have an integrated visual display configured to display information received from the cloud-based services device. The one or more antennas may include a first antenna and second antenna such that the first antenna and second antenna a physically remote from one another, such as located in separate work areas or at separate work stations in the same work area.

Another embodiment of the present disclosure is a method of managing a production process that includes the steps of: detecting at least one of one or more RFID tags with at least one antenna disposed at a known location; reading the at least one of the one or more RFID tags with an RFID reader that is in communication with the at least one antenna; transmitting information from the at least one of the one or more RFID tags and identification information for the at least one antenna to a communications hub; receiving the information about the at least one of the one or more RFID tags and the identification information for the at least one antenna by the communications hub; transmitting the information about the at least one of the one or more RFID tags and the identification information for the at least one antenna from the communications hub to a cloud-based services device; and determining the location of the production item based on the information about the at least one of the one or more RFID tags and the identification information for the at least one antenna. The method may also include the steps of: generating a request at a cloud-based services device for production of the one or more RFID tags based on a production order; transmitting the request to an RFID printer physically remote from the cloud-based services device; printing the one or more RFID tags; physically associating each of the one or more RFID tag with one or more production items; and associating each of the one or more RFID tags with its corresponding production item within the cloud-based services device. The method may also include the step of: receiving the production order at the cloud-based services device. The method may also include the step of: generating the production order at the cloud-based services device. The method may also include the step of: displaying the location of at least one of the one or more production items. The information about the at least one of the one or more RFID tags and the at least one antenna may include at least one of: 1) a time of initial detection of the RFID tag and 2) a time when detection of the RFID tag ceased. Where the one or more production items may include two or more production items, the method may include the step of: estimating an average interval between time of initial detection and cessation of detection by the at least one antenna for the RFID tags associated with the two or more production items. Where the at least one antenna includes a first antenna and a second antenna, and the one or more production items includes a plurality of production items, the method may include the step of: estimating an average interval between at least one of the detection or cessation of detection for each of the RFID tags associated with the plurality of production items by the first antenna and at least one of the detection or cessation of detection of each of the RFID tags associated with the plurality of production items by the second antenna. Where the antenna is one of a plurality of antennas with known locations that are physically separated, the method may include the step of: determining a movement path of the production item using information about the RFID tag and the plurality of antennas over time.

Another embodiment according to the present disclosure is a method of monitoring inventory that includes the steps of: performing a check-in or the check-out of inventory items associated with one or more RFID tags in an area by reading the one or more RFID tags using a first antenna in communication with an RFID reader; uploading the check-in or check-out information to a cloud-based services device via a communications hub in communication with the RFID reader; performing an inventory detection check of inventory items associated with the one or more RFID tags in the area by reading the one or more RFID tags using a second antenna in communication with the RFID reader; uploading the inventory check detection information to the cloud-based services device via the communications hub; generating an adjusted inventory record based on a previous inventory record stored in the cloud-based services device and the check-in or check-out information; and comparing the adjusted inventory record with the inventory detection check using control software on the cloud-based services device. If the adjusted inventory record and the inventory detection check do not match. The method may also include one or more of the steps of: generating a notification and generating an inventory adjustment.

Another embodiment of the present disclosure is a method of monitoring inventory including the steps of: detecting a presence of inventory associated RFID tags with an antenna; estimating a count of inventory items based on reading the RFID tags with an RFID reader in communication with the antenna; comparing the count with a selected threshold performing an inventory detection check with a processor in a cloud-based services device; and requesting additional inventory if the count is below the selected threshold. The selected threshold may be determined based on one or more of: (a) the historical demand profile of material determined as determined by past RFID tag activity; (b) global-, site-, or bin-level activity and planning parameters; (c) nominal and historical lead time characteristics of the material; (d) forecasted demand; (e) production forecasts; and (f) reservations for material. The selected threshold may, additionally or alternatively, be based inventory for one or more of: a single physical location, an entire facility, multiple facilities, and an entire organization.

Another embodiment of the present disclosure is a method of managing RFID devices, including the steps of: transmitting a message comprising a configuration change from a cloud-based services device to a communications hub remotely located from the cloud-based services device; transmitting the message directly to an RFID device from the communications hub; applying the configuration change in the message to the RFID device; generating a confirmation message with the RFID device if the application of the configuration change is successful; and transmitting the confirmation message to the cloud-based services device via the communications hub. The configuration change may be one or more of: a device configuration profile, a software update, and a firmware update. The method may also include the steps of: receiving the configuration change request at the cloud-based services device; and generating the configuration change with the cloud-based services device. The RFID device may include one or more of: an RFID printer and an RFID reader.

Examples of the more important features of the disclosure have been summarized rather broadly in order that the detailed description thereof that follows may be better understood and in order that the contributions they represent to the art may be appreciated. There are, of course, additional features of the disclosure that will be described hereinafter and which will form the subject of the claims appended hereto.

BRIEF DESCRIPTION OF THE DRAWINGS

The organization and manner of the structure and operation of the invention, together with further objects and advantages thereof, may best be understood by reference to the following description taken in connection with the accompanying drawings wherein like reference numerals identify like elements in which.

DETAILED DESCRIPTION OF THE DISCLOSURE

Figure 1:
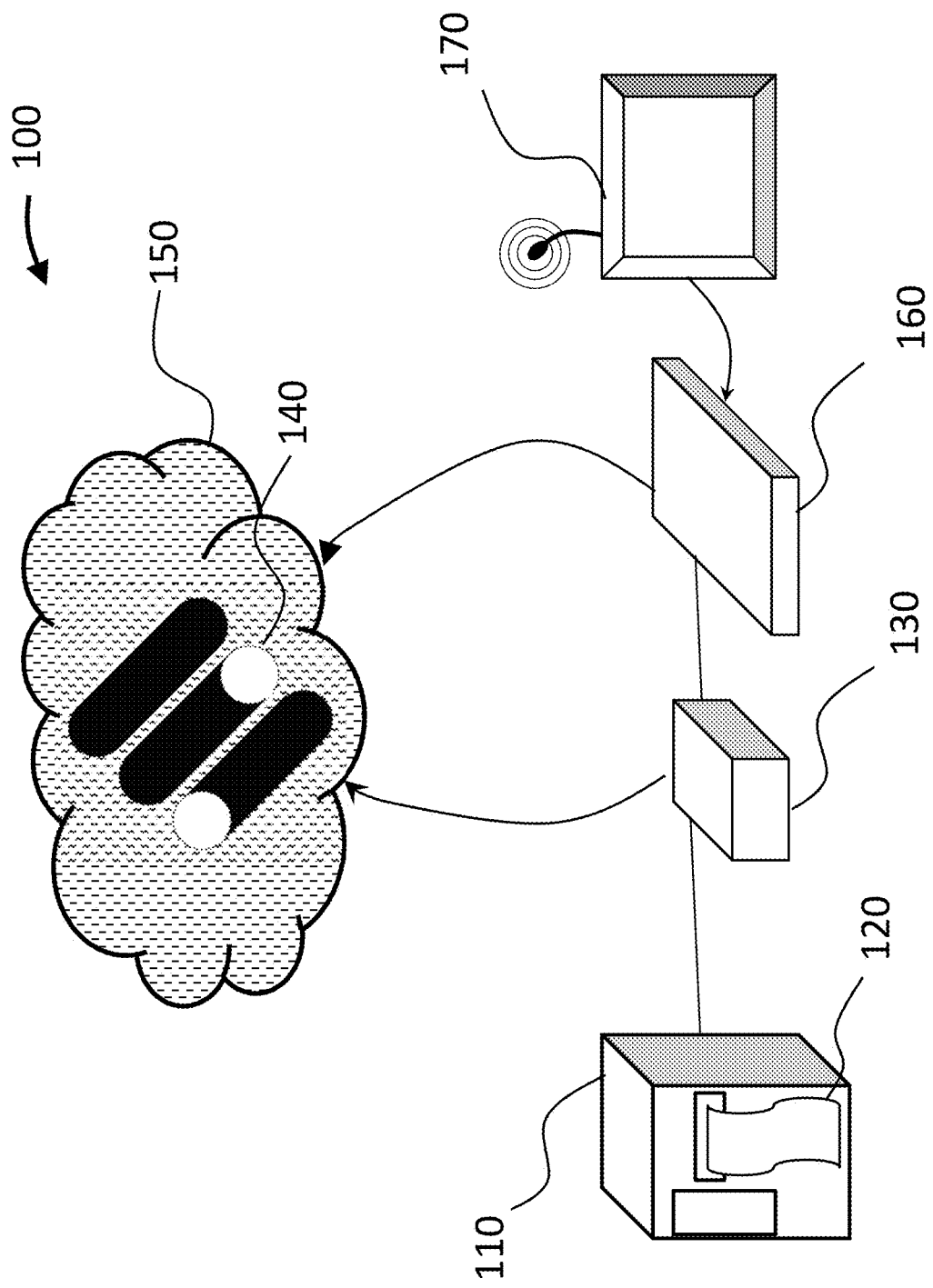
FIG. 1 is a system diagram of an RFID based inventory system according to one embodiment of the present disclosure.

The present disclosure contemplates that use of the environment and resources commonly called "the Cloud". Herein, the Cloud refers to a vast network of remote servers around the globe which are hooked together and meant to operate as a single ecosystem. The Cloud may include a host of cloud resources and combinations thereof. The cloud resources may include 1) a public cloud that shares resources and offers services to the public over the Internet, 2) a private cloud that offers services over a private internal network, 3) a hybrid cloud that shares services between public and private clouds depending on their purpose, and 4) a community cloud that shares resources only between organizations, such as with government institutions.

The present disclosure is directed to turning complicated RFID hardware systems into simpler Internet Of Things (IOT) based plug-and-play cloud-managed devices. RFID devices may be used to track check-in/check-out information so that the system can maintain stock levels and generate alerts or resupply instructions when stock levels drop below a selected threshold. Antennas may be deployed in order to identify the presence of RFID tagged inventory within a warehouse or storage area.

While this invention may be susceptible to embodiment in different forms, there are shown in the drawings and will be described herein in detail, specific embodiments with the understanding that the present disclosure is to be considered an exemplification of the principles of the invention, and is not intended to limit the invention to that as illustrated.

FIG. 1 shows diagram of a system 100 for inventory management according to one embodiment of this disclosure. The system 100 may include at least one RFID printer 110, at least one communications hub 130 configured to communicate with the Cloud 150, a cloud-based services device 140 residing in the Cloud 150, at least one RFID reader 160, and at least one antenna 170.

The RFID printer 110 is capable of printing out or generating RFID tags 120. In some embodiments the RFID tags 120 are passive, requiring electromagnetic energy from an RFID reader 160 to power the antenna and integrated circuit within the RFID tags 120. The RFID printer 110 may be associated with the communications hub 130. In some embodiments, the RFID printer 110 may be optional if there are pre-existing RFID tags 120. Pre-existing RFID tags 120 may be active or passive. In some embodiments, the RFID tags 120 may include RFID tags printed by the RFID printer 110 and pre-existing RFID tags.

The communications hub 130 may communicate with the RFID printer 110 and/or the cloud-based services device 140 via wires or wirelessly. The communications hub 130 may be a plug and play (PnP) device that does not require user intervention to connect to other components of the system 100. The communication hub 130 may include a computer processor, a communications interface, and a memory containing software that, when executed, performs communications between the cloud services 140 and the RFID devices 110, 160. One exemplary physical device capable of running the software to function as a communications hub 130 is a Next Unit of Computing (NUC) manufactured by Intel, Inc.

The cloud-based services device 140 may include one or more servers containing software for performing steps of methods of inventory management that reside in the Cloud 150. One aspect of the cloud-based services device 140 is that it may act as a web portal as would be understood by a person of skill in the art. In some embodiments, the cloud-based services device 140 includes as memory or access to a memory containing control software that, when executed, configures the cloud-based services device 140 to act as a system controller and database for operating the system 100. The control software executed by the cloud-based services device 140 may be configured for, but is not limited to, one or more of: managing RFID tags, inventory item information, location data, reports and alerts; generating reports; displaying information about the inventory items, RFID tags, and components of the system; managing lot traceability details; managing shelf life for perishable assets; managing calibration data for assets subject to calibration; tracking of Key Performance Indicators (KPI); generating KPI boards; and performing data mining and analytics, and other related data management, analytics, and display capabilities that would be understood by a person of ordinary skill in the art.

The RFID reader 160 may communicate with the communications hub 130 and/or the cloud-based services device 140 via wires or wirelessly. One exemplary RFID reader is a Speedway R420, manufactured by Impinj, Inc. of Seattle, Wash. While shown as separate devices, in some embodiments the communications hub 130 and the RFID reader 160 may be collocated in a single housing or their functions performed by a single component. In some embodiments, the RFID reader 160 may be configured to, once in communication with the communications hub 130 and cloud-based services device 140, to reach out to the cloud-based services device 140 to obtain configuration profile information required for the RFID reader 160 to operate as part of the system 100 and to apply said configuration profile information. In this manner, the RFID reader 160 does not require physical colocation with the cloud-based services device 140 or even being located on the same local area network as the cloud-based services device 140. The RFID reader 160 is in communication with the at least one antenna 170. In some embodiments, the antenna 170 may be a simple antenna connected to and powered by the RFID reader 160. In other embodiments, it is contemplated that the antenna 170 may have its own power source and, optionally, its own positioning system to determine its location, either globally or relative to local positioning signals. The cloud-based services device 140 may be programmed with location information for each of the antennas 170.

When the RFID reader 160 interrogates an RFID tag 120 in communication with a particular antenna 170, an indication of the particular antenna 170 is also communicated to the cloud-based services device 140 so that the location of the contact with the RFID tag 120 can be known and stored by the cloud-based services device 140. In some embodiments, each antenna 170 may be associated with a task or process that takes place at that location. In some embodiments, the antenna 170 may be capable of providing updated location information on its own, such as when the antenna 170 is equipped with its own position detection circuitry, such as a GPS or other suitable location detection technology. When the at least one antenna 170 detects an RFID tag 120, the information on the RFID tag 120 is transmitted by the antenna 170 to the RFID reader 160, which reads the RFID tag 120 information and transmits it up to the cloud-based services device 140 either directly or through the communications hub 140. The antennas 170 have known locations and multiple antennas 170 may be associated with a single RFID reader 160. Known locations of antennas 170 may be static or dynamic.

Figure 2:
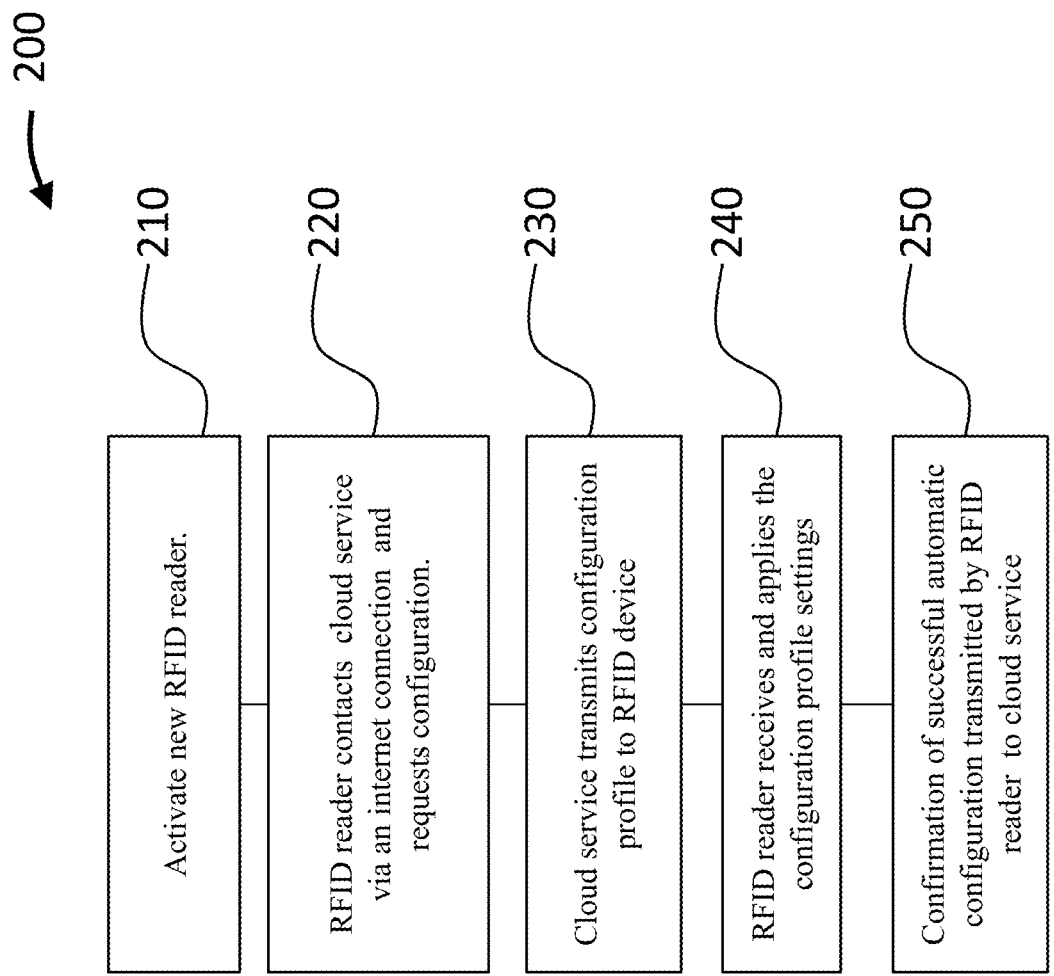
FIG. 2 is a flow chart of a method for configuring a new RFID device according to one embodiment of the present disclosure.

FIG. 2 shows a flow chart for a method 200 of configuring an RFID device, such as RFID printer 110, RFID reader 160, or other suitable RFID device according to one embodiment of the present disclosure. In step 210, an RFID device 110, 160 is activated by a user. In some embodiments, activation by the user may merely be plugging the RFID device 110, 160 into a power source and connecting it to the communications network on which the communications hub 130 is also connected. In step 220, the RFID device 110, 160 communicates with the cloud-based services device 140 via an internet connection and requests configuration. In some embodiments, step 220 may be initiated by the RFID device 110, 160 without user participation. In other embodiments, this connection is established via the communications hub 130. In step 230, the cloud-based services device 140 transmits a configuration profile to the RFID device 110, 160. In some embodiments, this configuration profile is sent directly from the cloud-based services device 140 to the RFID device; in others the configuration profile is transmitted via the communications hub 130. In step 240, the RFID device 110, 160 receives the configuration profile and applies the profile settings. The profiles settings may include, but are not limited to, networking profiles, RFID reading profiles, data masking, compression, and processing parameters, antenna power and threshold settings, print settings, label configuration parameters, tuning sequences, and the like as would be understood by a person of ordinary skill in the art. In step 250, the RFID device 110, 160, if configuration is successful, may transmit a confirmation message to the cloud-based services device 140. In some embodiments, the cloud-based services device 140 may push configuration profile information to the RFID device 110, 160. In some embodiments, the RFID device 110, 160 may be programed to pull configuration profile information from the cloud-based services device 140.

Figure 3:
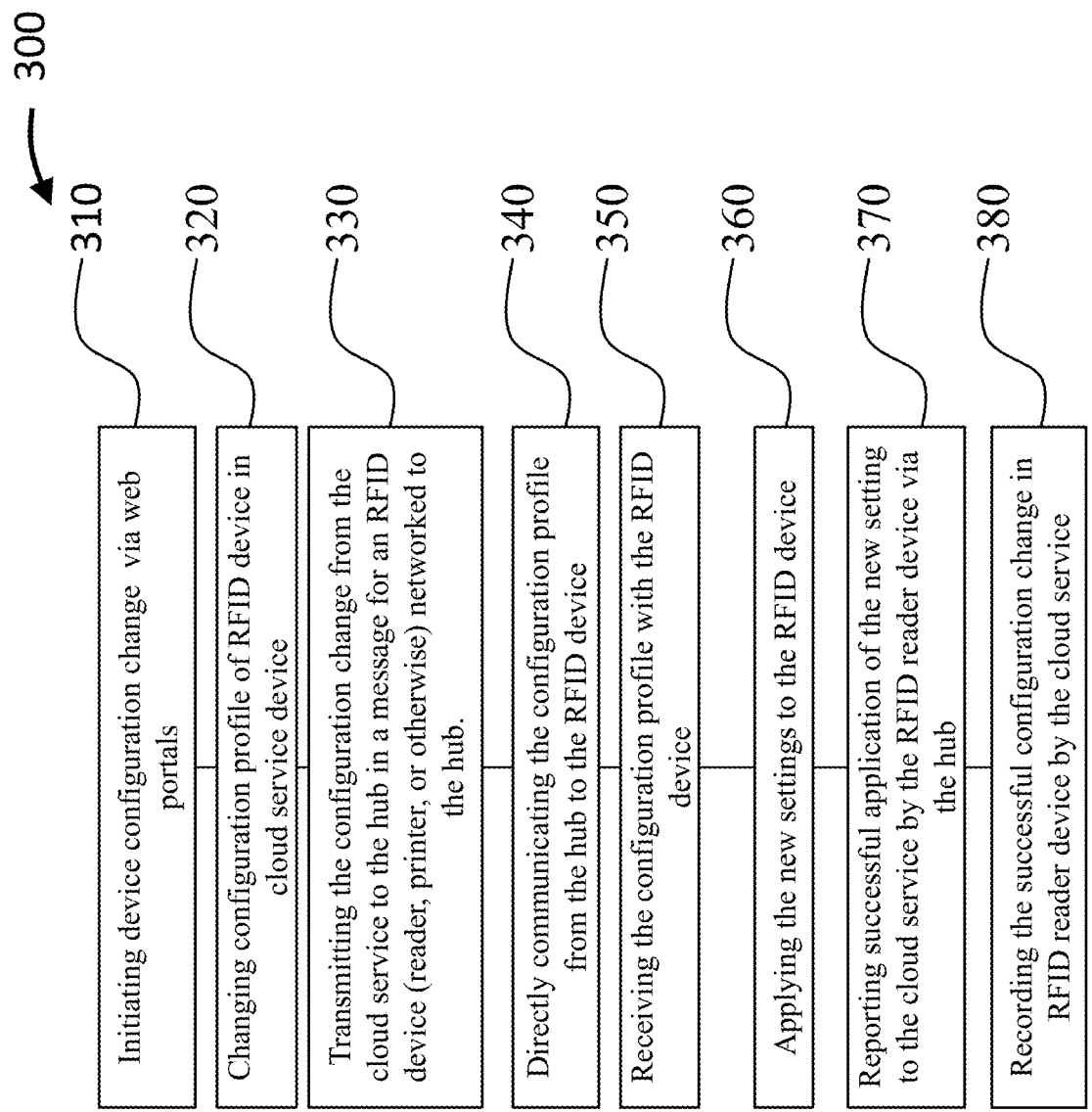
FIG. 3 is a flow chart of a method for changing a configuration of an existing RFID device according to one embodiment of the present disclosure.

FIG. 3 shows a flow chart for a method 300 of changing a configuration of a RFID device 110, 160 according to one embodiment of the present disclosure. In step 310, the user may select a device for a configuration change via a web portal that accesses the cloud-based services device 140 in the Cloud 150. In step 320, the user may change the configuration profile of the device, such as a RFID device 110, 160, at the cloud-based services device 140. In step 330, the configuration change may be transmitted from the cloud-based services device 140 to the communications hub 130 that is associated with the RFID device 110, 160. A configuration change may include a change to an existing configuration profile or add an initial configuration profile on an RFID device 110, 160. In step 340, the configuration profile may be directly communicated from the communications hub 130 to the RFID device 110, 160. Direct communications between the communications hub 130 and the RFID device 110, 160 negates the need for customer database servers and control software located on a customer controlled network (Virtual Private Network or other). In step 350, the RFID device 110, 160 may receive the configuration profile message from the communications hub 130. In step 360, the new configuration settings in the message may be applied to the RFID device 110, 160. In step 370, a confirmation message may be generated by the RFID device 110, 160 and transmitted to the communications hub 130 when the new configuration profile has been successfully updated to the RFID device 110, 160. In step 380, the communications hub 130 transmits the confirmation message to the cloud-based services device 140 where it is received and recorded by the cloud-based services device 140. In some embodiments, steps 370 and 380 may be performed with a failure message if the configuration profile is not applied to the RFID device 110, 160. In some aspects, the method 300 may be used to for the cloud-based services device 140 to update software, firmware, and/or configuration profiles on the RFID devices 110, 160. In some embodiments, the cloud-based services device 140 may be configured to log the configuration change as a failure (or success) if no confirmation (or failure) message is received within a predetermined time period.

Figure 4:
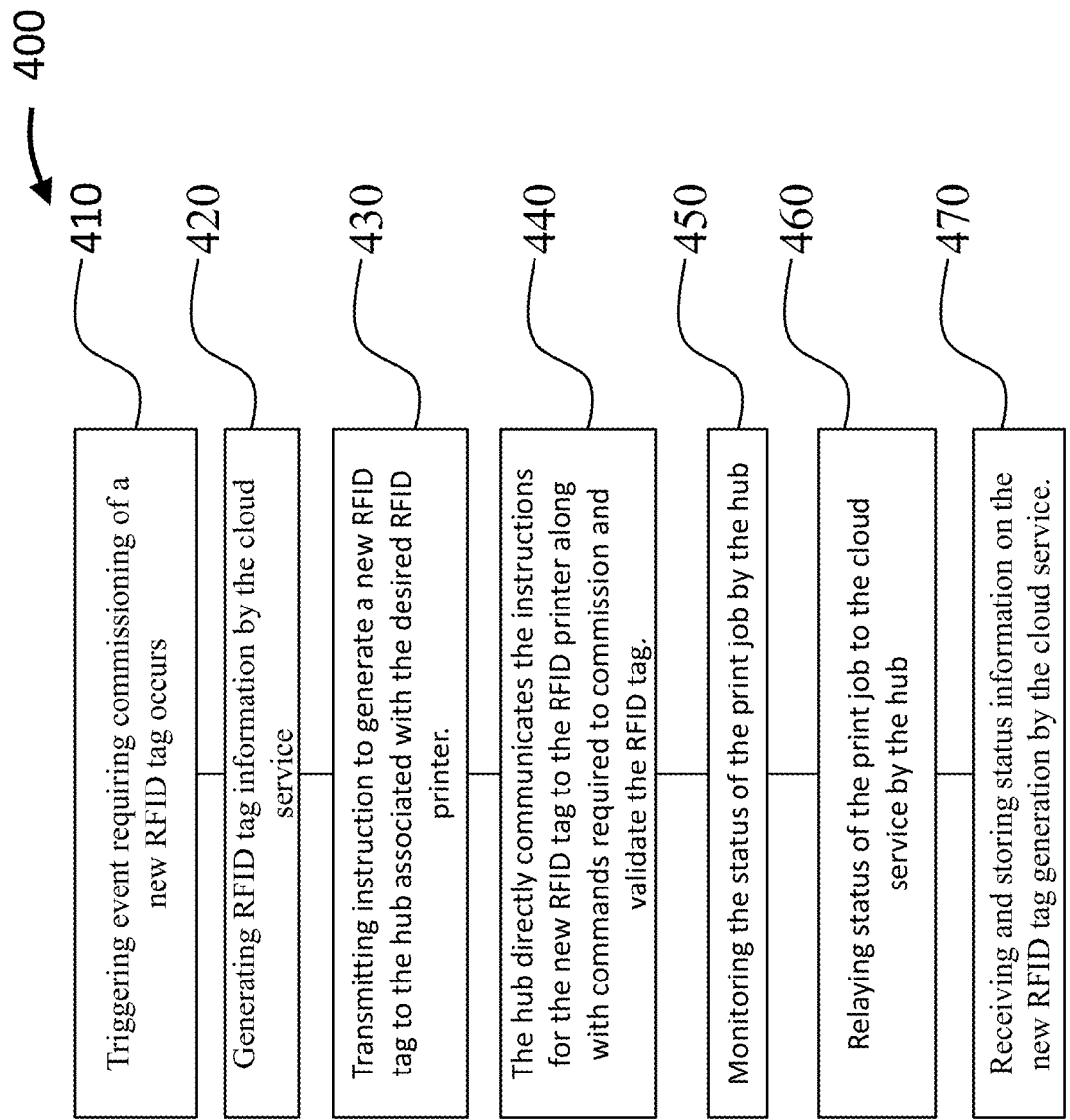
FIG. 4 is a flow chart of a method of commissioning a new RFID tag for use with the system of FIG. 1.

FIG. 4 shows a flow chart for a method 400 of commissioning a new RFID tag 120 according to one embodiment of the present disclosure. In step 410, a user decides that a new RFID tag 120 is required for a work article, such as a work piece in development, a finished piece in inventory, or a durable tool (a borrowable piece of equipment). In some embodiments, the RFID tags 120 may be subdivided into types, whereby each type of RFID tag 120 may be used with specific types of items. For example, durable tools may have their own type of RFID tag 120 that is separate from the RFID tags 120 used for consumable inventory since there is an expectation for the durable tool to be returned or require maintenance, whereas consumable inventory is not expected to return to inventory, unless it is unused. In step 420, the cloud-based services device 140 generates information for the RFID tag 120. In step 430, the RFID tag information is transmitted to a RFID printer 110 via the communications hub 130. In step 440, the communications hub 130 directly communicates the instructions for the new RFID tag 120 to the RFID printer 110 and validates the RFID tag. In step 450, the communication hub 130 monitors the generation of the RFID tag 120 generation by the RFID printer 110. In step 460, the status of the RFID tag generation is relayed to the cloud-based services device 140 by the communications hub 130. In step 470, the status information on the new RFID tag generation operation is received and stored by the cloud-based services device 140.

Figure 5:
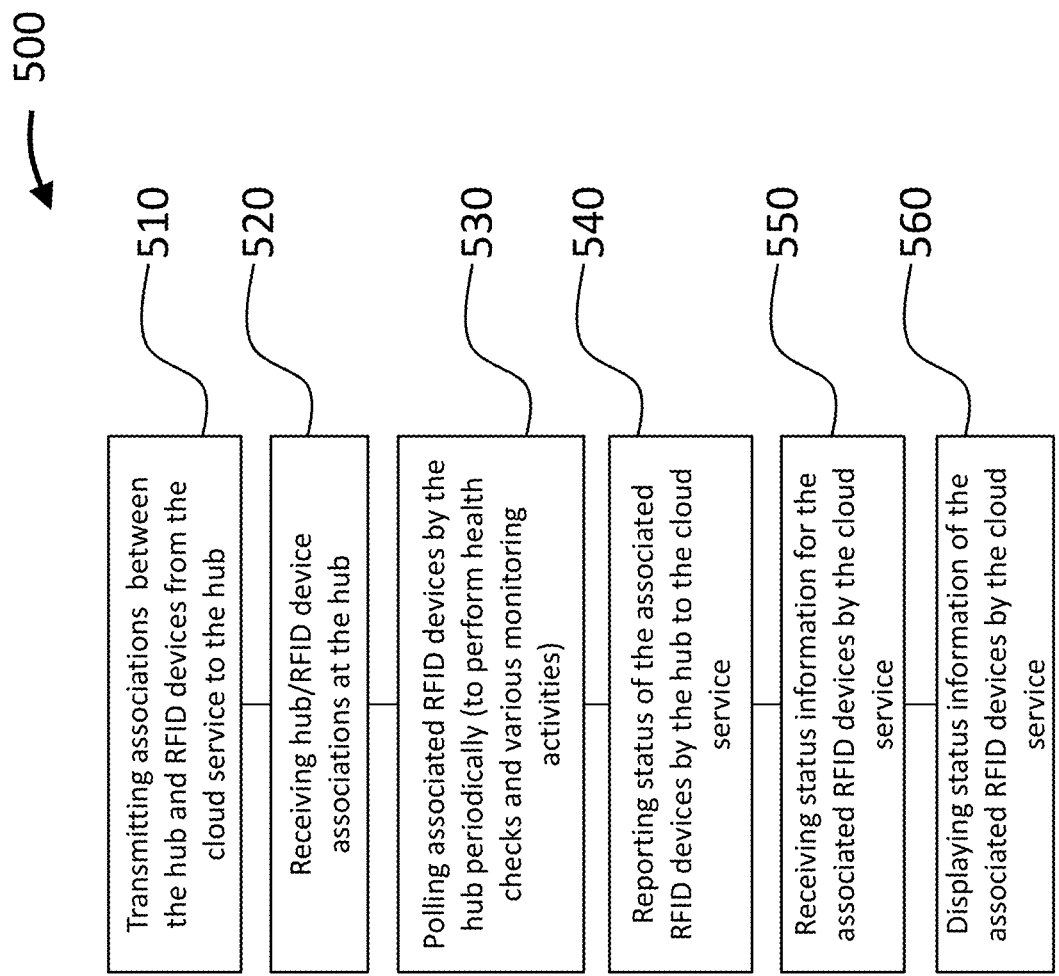
FIG. 5 is a flow chart of a method for monitoring RFID devices using the system of FIG. 1.

FIG. 5 shows a flow chart for a method 500 of monitoring RFID devices according to one embodiment of the present disclosure. In step 510, associations between one or more RFID devices 110, 160 and the communications hub 130 are transmitted from the cloud-based services device 140 to the communications hub 130. In step 520, the communications hub 130 receives the associations between the RFID devices 110, 160 and the communications hub 130. In step 530, the communications hub 130 periodically polls the associated RFID devices 110, 160 for status information. In some embodiments, the communications hub 130 may poll the associated RFID devices 110 every minute; however, the polling interval is configurable, and any period may be selected by the user or programmatically adjusted by the cloud-based services device 140 to optimize performance. It is also contemplated that the RFID devices 110, 160 can be polled on an ad hoc basis, either individually or as a group. Status information may include status of RFID devices 110, 160 or RFID tagged items (via their RFID tags 120). Status information for RFID devices 110, 160 may include, but is not limited to, one or more of: health checks, progress monitoring, job statuses, operating temperatures, operating humidities, duty cycles, configuration parameters, version information serial numbers, profiles, and location information. Status information for RFID tagged items may include, but is not limited to, one or more of: check-in, check-out, presences, WIP step, commencement of a WIP task, and conclusion of a WIP task. In step 540, the polled information gathered by the communications hub 130 is transmitted to the cloud-based services device 140. In step 550, the cloud-based services device 140 receives and stores the status information for one or more RFID devices 110, 160.

In step 560, the cloud-based services device 140 may display the status information for one or more of the RFID devices 110, 160 or the presence or quantity of tagged inventory. In some embodiments, the displaying step may include showing a heat map graphically depicting a degree of a status parameter, such as degrees of health or activity, for the RFID devices 110, 160. Herein, a "heat map" means a representation of data in the form of a map or diagram in which data values are represented as colors. In some embodiments, the display may be updated in real time and/or sped up to show historical information in time lapse.

In some embodiments, proximity of an RFID tag 120 associated with a particular inventory item to a specific antenna 170 may trigger an alert or be displayed as a violation because the RFID tag 120 associated with that particular inventory is not allowed in the area where that specific antenna 170 is located (fencing out). Conversely, an alert may be triggered and/or displayed as violation when an RFID tag 120 associated with a particular inventory item is removed from an area where that specific antenna 170 is located (fencing in).

Figure 6:
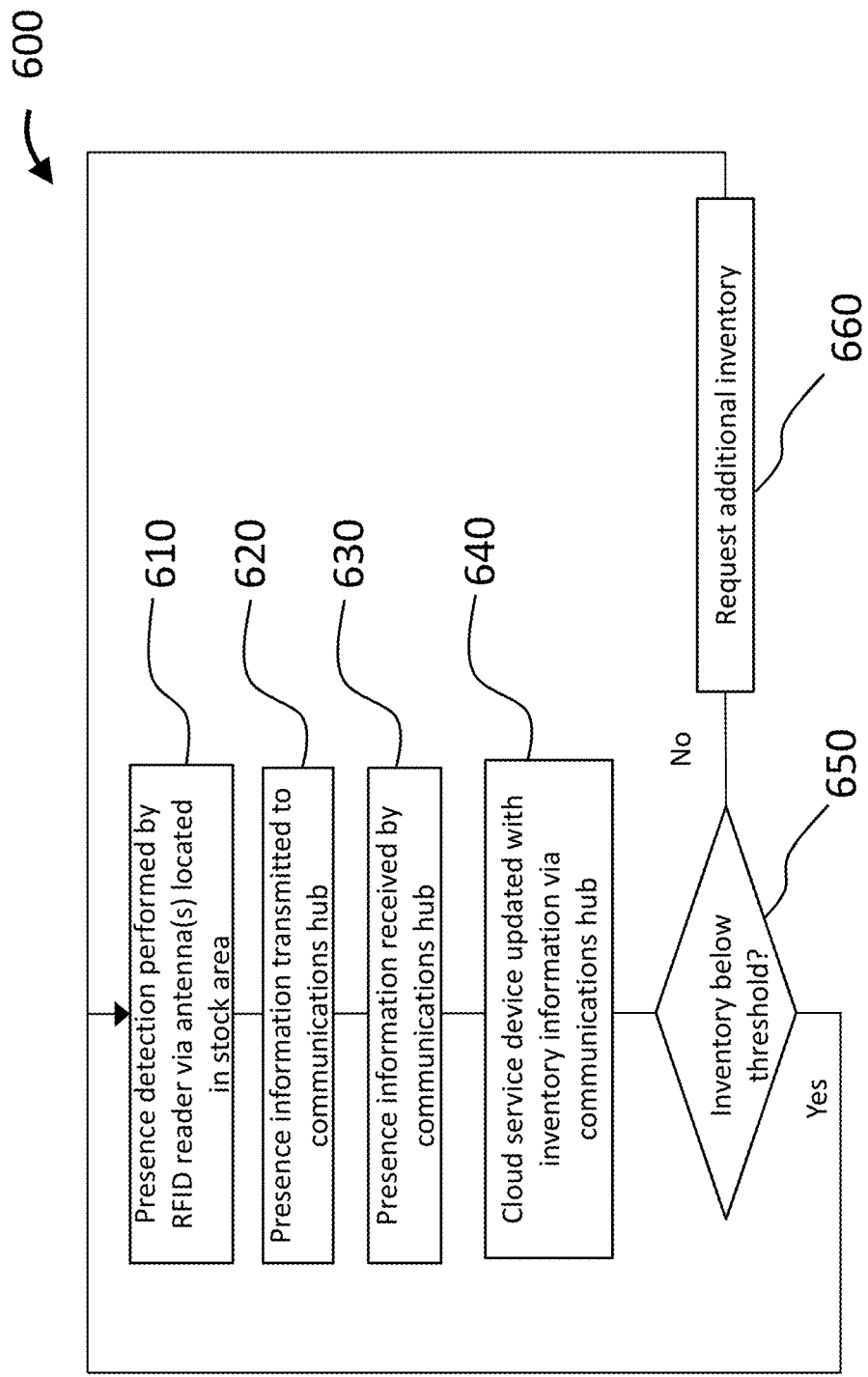
FIG. 6 is a flow chart of a method of monitoring inventory availability using the system of FIG. 1.

FIG. 6 shows a flow chart for a method 600 of monitoring inventory according to one embodiment of the present disclosure. In step 610, the detection of inventory is performed. Detection may include the response of one or more RFID tags 120 in the presence of an antenna 170. The one or more RFID tags 120 are read by an RFID reader 160 to identify which associated inventory items are within range of the antenna 170. In step 620, the information on the RFID tags 120 within range of the antenna 170 is transmitted to the communications hub 130. In step 630, the RFID tag information is received by the communications hub 130. In step 640, the cloud-based services device 140 is updated with the information provided by the communications hub 130. The cloud-based services device 140 may compare the current inventory amount detected with previous records to determine if there have been additions or deletions from inventory. The absence of presence may be construed as cessation of presence if there was an expectation of an RFID tag 120 being located within range of the antenna 170 but it is not found. In step 650, the detected inventory may be compared with a selected threshold for the amount of inventory expected to be available. The selected threshold amount may be a statically defined quantity, or it may be calculated based on, but are not limited to, one or more of: (a) the historical demand profile of material determined as determined by past RFID tag activity, (b) global-, site-, or bin-level activity and planning parameters, (c) nominal and historical lead time characteristics of the material, which may vary by physical location, (d) forecasted demand, as may be determined via production forecasts, reservations for material, or other similar methods, and other factors that would be known to one of ordinary skill in the art. In some embodiments, the selected threshold may be determined based on using one or more of the above factors for a single physical location, an entire facility, multiple facilities, or an entire organization, such as a corporation or other independently controlled business association. If the detected amount of inventory is below the threshold, then the cloud-based services device 140 may initiate a request for additional inventory in step 660. Steps 650 and 660 provide for stocking levels to be maintained at, above, or below a selected threshold. A request for additional inventory may be transmitted to, but is not limited to, one or more of: a purchasing function, other locations that stock similar inventory, and a management function that prioritized restocking of inventory. If the detected amount of inventory is at or above the selected threshold, then the method 600 may repeat to continue monitoring.

Figure 7B:
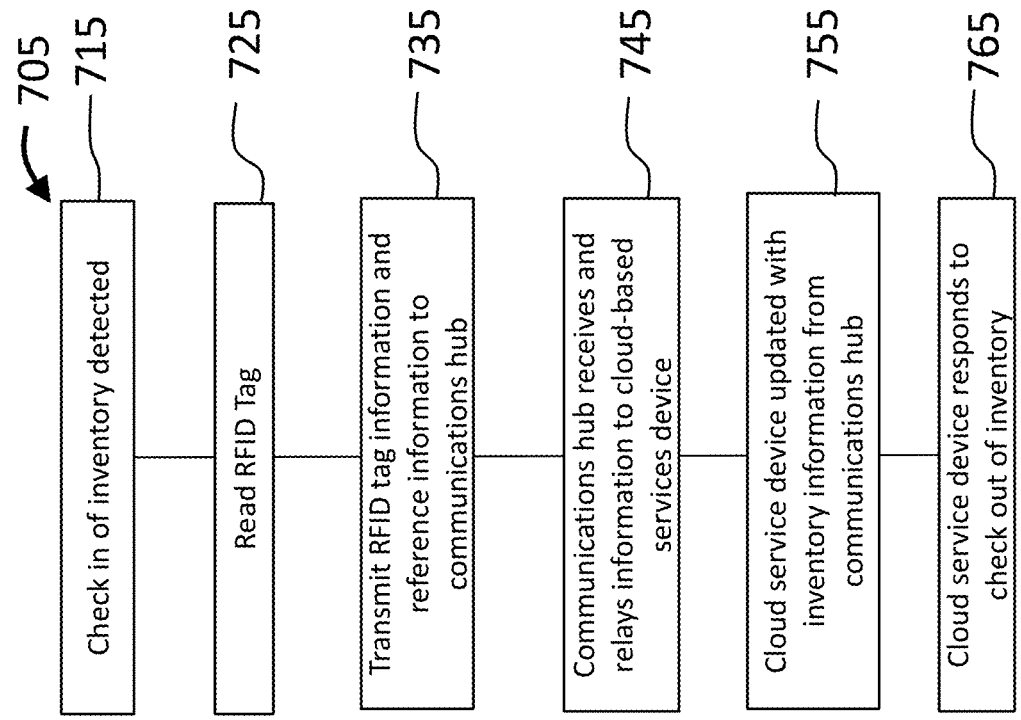
FIG. 7b is a flow chart of a method of checking in inventory using the system of FIG. 1.
Figure 7A:
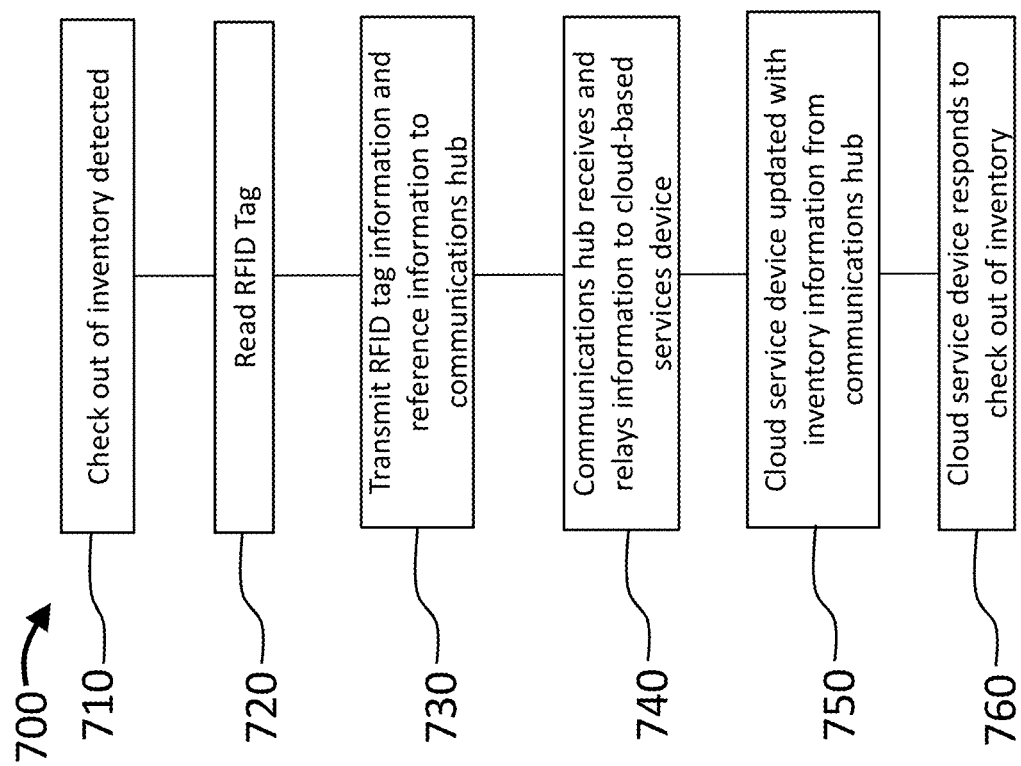
FIG. 7a is a flow chart of a method of checking out inventory using the system of FIG. 1.

FIG. 7a shows a flow chart for a method 700 of checking out inventory according to one embodiment of the present disclosure. In step 710, check-out of inventory is detected. Check-out may occur by an inventory item with an RFID tag 120 being moved within range of an antenna 170. The antenna 170 may be known by the cloud-based services device 140 and configured to represent the checking out of the inventory item so that the RFID tag 120 is energized for reading. In step 720, the RFID tag 120 may be read by an RFID reader 160. In step 730, the RFID tag information may be transmitted to the communications hub 130. In step 740, the communication hub 130 receives and relays the RFID information and any additional reference information from the RFID reader 160 to the cloud-based services device 140. In step 750, the cloud-based services device 140 is updated with information from the communications hub 130. Thus, based on the reading of the RFID tag 120 by the specific RFID reader 160 and antenna 170, the inventory record in the cloud-based services device 140 indicates that the inventory item has been checked out. In step 760, the cloud-based services device 140 may respond to the check-out action. For example, a response may include—1) if the inventory is consumable, the cloud-based services device 140 may execute method 600 to check inventory against selected thresholds for that inventory item and 2) if the inventory is a borrowable item, the information regarding the identity of the borrower, and expected return date may be stored, if available.

FIG. 7b shows a flow chart for a method 705 for checking in inventory according to one embodiment of the present disclosure. In step 715, a check-in of inventory is detected. Check-in may occur by an inventory item with an RFID tag 120 being moved within range of an antenna 170. The antenna 170 may be known by the cloud-based services device 140 and configured to represent the checking in of the inventory item so that the RFID tag 120 is energized for reading, similar to step 710. In step 725, the RFID tag 120 may be read by an RFID reader 160. However, the check-in method 705 and check-out method 710 may use their own dedicated RFID readers 160 and antennas 170. Alternatively, reference information may be sent with the read RFID information to indicate whether a check-in or a check-out is being performed. In step 735, the RFID tag information may be transmitted to the communications hub 130, as in step 730. In step 745, the communication hub 130 receives and relays the RFID information and any additional reference information from the RFID reader 160 to the cloud-based services device 140. In step 755, the cloud-based services device 140 is updated with information from the communications hub 130. Thus, the inventory record in the cloud-based services device 140 indicates that inventory has been checked in. In step 765, the cloud-based services device 140 may respond to the check-in action. For example, a response may include—1) if the inventory is consumable, the cloud-based services device 140 may execute method 600 to check inventory against selected thresholds for that inventory item to make sure that adequate inventory is available or to double check arrival at the antenna 170 located in the inventory area and 2) if the inventory is a borrowable item, the borrowable item may need to be scheduled for diagnostics or maintenance to ensure that it is good condition for the next user to check-out.

It is contemplated that check-in and check-out functions of methods 700 and 705 may be alternatively performed or complemented by detection of presence of method 600. In some embodiments, a check-out may be assumed by the cloud-based services device 140 recognizing a cessation of detection of an RFID tag 120 and a check-out may be assumed by the cloud-based services device recognizing the detection of an RFID tag 120 that was not present in a designated location during the last inventory monitoring poll performed. It is also contemplated that steps of method 600 and steps of one or more of methods 700 and 705 may be used together to identify inventory count discrepancies that may be used as a trigger in the cloud-based services device 140 to generate an alert notification or adjust the quantities of discrepant items accordingly.

Figure 8:
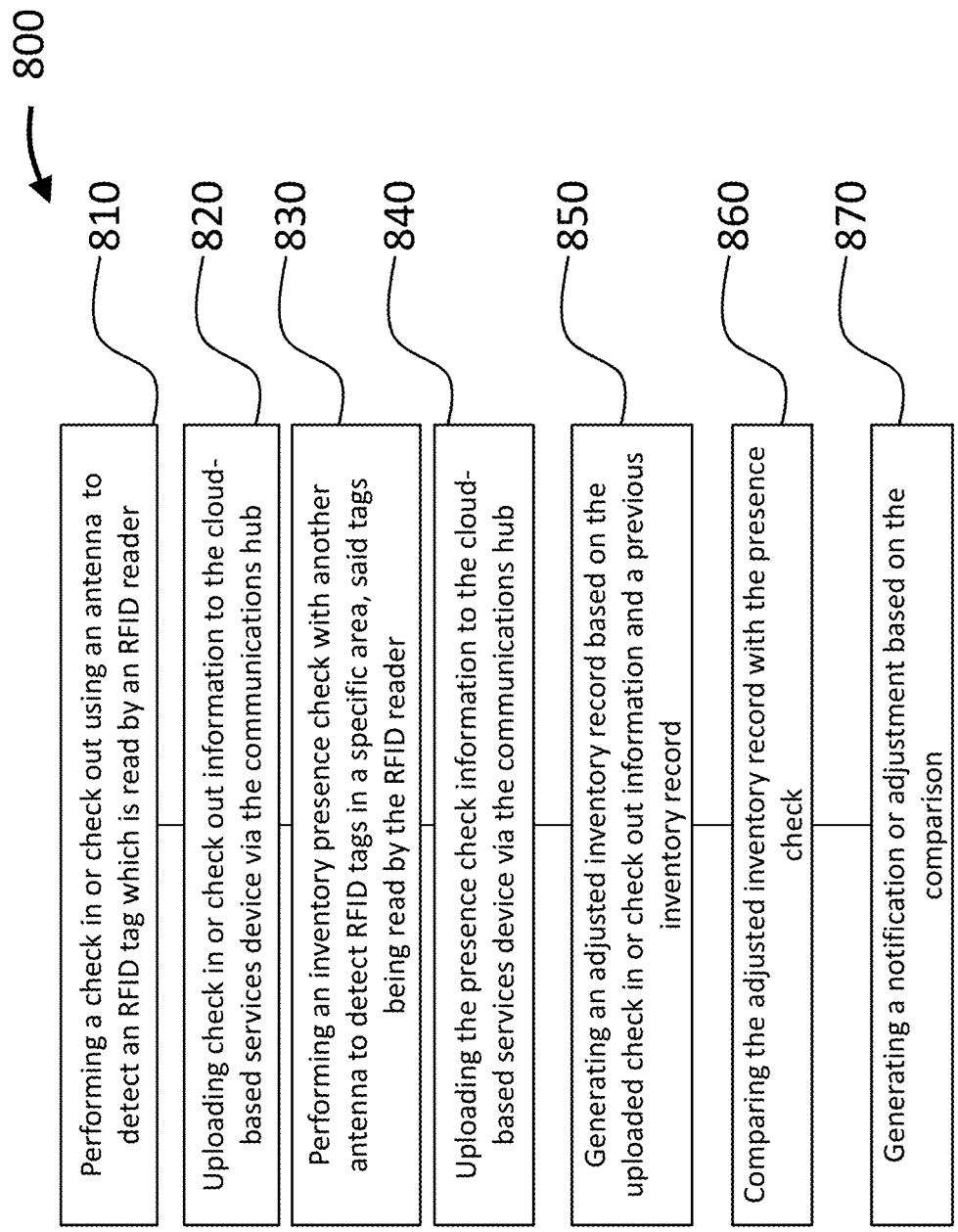
FIG. 8 is a flow chart of a method of identifying inventory count discrepancies using the system of FIG. 1.

FIG. 8 shows a flow chart for a method 800 for identifying inventory count discrepancies according to one embodiment of the present disclosure. In step 810, a check-out or check-in is performed when an antenna 170 detects an inventory item for check-in or check-out and the RFID tag 120 on the inventory item is read by an RFID reader 160. The antenna 170 used of check-in and check-out may be located near an entry or egress point for a storage area for the inventory items. In some embodiment, separate antennas 170 may be used for check-in and check-out. In step 820, the check-in or check-out information is uploaded to the cloud-based services device 140 via the communications hub 130, such as in methods 700 and 705. In step 830, an inventory detection check is performed on the storage area by another antenna 170 positioned in or near the storage area to detect the presence of the inventory item's RFID tags 120 while the inventory is in a specific location. In step 840, the presence information is uploaded to the cloud-based services device 140 via the communications hub 130, as in method 600. In some embodiments, the antenna(s) 170 used for presence detection may have different coverage areas than the antenna(s) 170 used for check-in or check-out. For example, the antenna(s) 170 for may be located at an entrance or exit or other access control point and have a range to detect the RFID tags 120 proximate to that location, while the antenna(s) 170 for presence detection may be located to provide coverage of inventory that is within a storage or work area. In other embodiments, presence detection may be accomplished with a mobile device that integrates an RFID reader 160 and one or more antennas 170. The same or different RFID readers 160 may be used for check-in or check-out and for presence detection. In step 850, the control software in the cloud-based services device 140 may generate an adjusted inventory record by incrementing a previous inventory record stored on the cloud-based services device 140 with the check-in or check-out information. In step 860, the control software in the cloud-based services device 140 may perform a comparison between the adjusted inventory record and the presence information. In step 870, a notification or alert, or an inventory adjustment, may be generated based on the comparison. If the comparison shows a discrepancy between the adjusted inventory record and the presence information, then the user may be prompted to investigate further or alternatively, an inventory adjustment may be programmatically made. If no discrepancy is found, then the comparison may be logged to provide a historical record of reconciled inventory.

Figure 9:
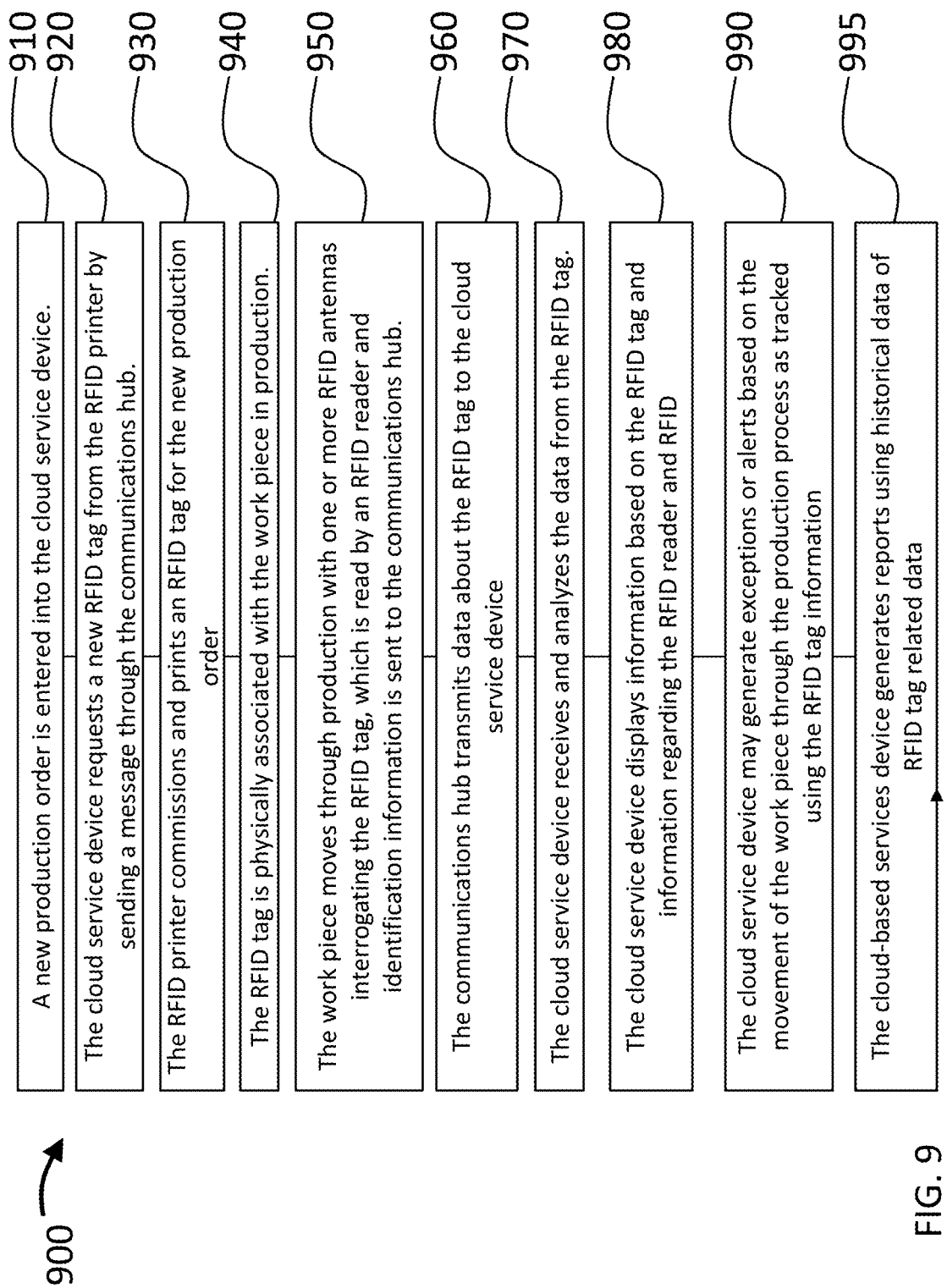
FIG. 9 is a flow chart of a method of monitoring work-in-process using the system of FIG. 1.

FIG. 9 shows a flow chart for a method 900 for monitoring Work-In-Process (WIP) according to one embodiment of the present disclosure. In step 910, a new work order is initiated in the cloud-based services device 140 by the user. In step 920, the cloud-based services device 140 sends a new RFID tag 120 request to the RFID printer 110 via the communications hub 130. In step 930, the RFID tag 120 is printed by the RFID printer 110 and commissioned. The RFID printer 110 may be located at a job or manufacturing site that is remote from the cloud-based services device 140. In step 940, the RFID tag 120 may be physically associated with the WIP item (work piece) that will be developed during manufacturing, such as being physically attached to the WIP item or, alternatively, the RFID tag 120 may be applied to the WIP item's traveler, container, or other physical item that accompanies the WIP item along the manufacturing process. In step 950, the WIP item is moved through the production process. At predetermined stages of the production process, an RFID antenna 170 connected to an RFID reader 160 interrogates the RFID tag 120 and the RFID reader 160 transmits information about the RFID tag 120 to the communications hub 130. In step 960, the communications hub 130 transmits information about the RFID tag 120 to the cloud-based services devices 140. In step 970, the cloud-based services devices 140 may receive the information about the RFID tag 120, such as its recent proximity to an RFID antenna 170. A plurality of antennas 170 may be strategically positioned at different locations or work station areas that represent different stages of the manufacturing process. Thus, proximity to each antenna 170 may represent a progress level of the WIP item.

In step 980, the cloud-based services device 140 displays information based on the RFID tag 120 and/or information on the RFID reader 160 and the RFID antenna 170. Displays of information may include real-time maps, heat maps, and other analytics based on the progress and status of the work piece. Since the location and function of production equipment is known relative to the locations of the RFID antennas 170 and/or RFID reader 160, the reading of the RFID tag 120 combined with location information from the RFID antenna 170 and/or RFID reader 160 can provide status information as to the progress of the associated work piece during the production process. In step 990, the cloud-based services device 140 may generate alerts and/or exception reports based on the information received from the RFID tag 120. In some instances, the cloud-based services device 140 may include a schedule governing the expected movement of the RFID tag 120 through a production queue being monitored by a plurality of RFID antennas 170. Then, if there is a deviation from an expected movement or predicted time schedule beyond a predetermined threshold, an alert may be triggered. Alertable conditions may include, but are not limited to, delays, stuck jobs, out-of-sequence movement, slow-moving work centers, bottlenecks, and overloaded work centers. In step 995, the cloud-based services devices 140 may generate one or more reports based on the RFID tag 120 information received. The one or more reports may include a historical path of the RFID tag 120 through the production process including times at various RFID antennas 170. Another report may include counts or average times of RFID tags 120 detected by various RFID antennas 170 over time. Another report may include aggregated statistics of one or more work center's performance in terms of throughput of work pieces and average processing (or cycle) time, optionally charted against low and high thresholds. In some embodiments, one or more of steps 970, 980, and 990 may be optional or occur out of order.

In some embodiments, proximity of a particular RFID tag 120, with its associated WIP item, to a specific antenna 170 may trigger an alert or be displayed as a violation because the RFID tag 120 associated with a particular WIP item is not allowed in the area where that particular antenna 170 is located (fencing out). Conversely, an alert or violation may occur when an RFID tag 120 associated with a particular WIP item is removed from an area where that particular antenna 170 is located (fencing in).

Figure 10:
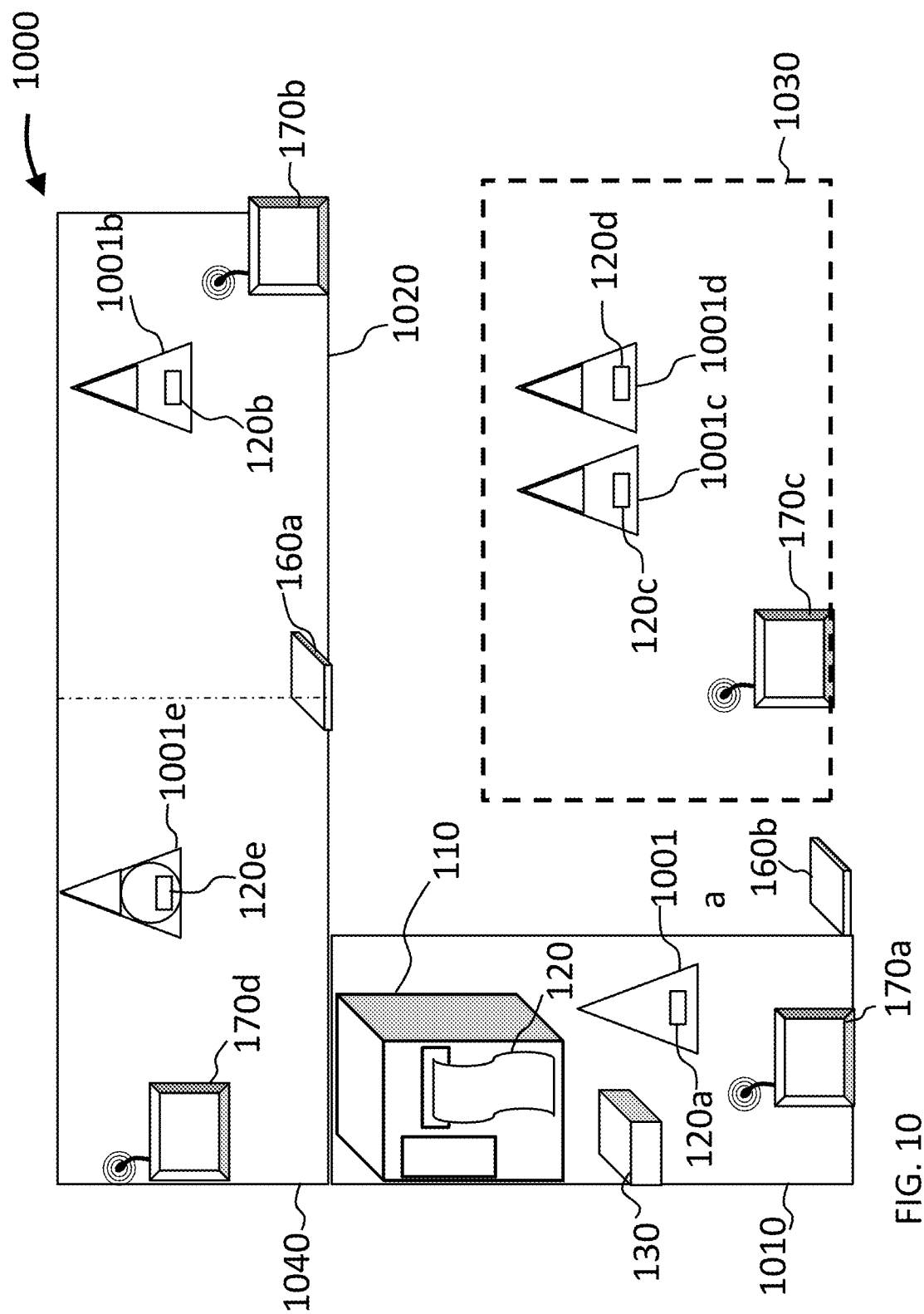
FIG. 10 is a diagram of a factory facility using the system of FIG. 1 within work items in various stages of production.

FIG. 10 shows an RFID enabled manufacturing system 1000 according to one embodiment of the present disclosure. In this example, the system 1000 includes a plurality of work areas 1010, 1020, 1030, 1040 and an RFID system 100 that is distributed throughout the work areas 1010, 1020, 1030, 1040. WIP items 1001*a-e* are shown in various stages of the manufacturing process, and the cloud-based services device 140 is not shown, but is in communication with the communications hub 130. Each WIP item 1001*a-e* has its own corresponding RFID tag 120*a-e*. In operations, the methods 200, 300, 400, 500, 600, 700, 705, 800, 900 may be executed in a warehouse with consumable and borrowable inventory or factory setting with numerous WIP items in various stages of development. In this example, the antennas 170*a*, 170*c* are associated with the RFID reader 160*b*; the antennas 170*b*, 170*d* are associated with the RFID reader 160*a*; and both of the RFID readers 160*a*, 160*b* are associated with the communication hub 130.

Thus, once joined to the system 100, the RFID printer 110 can produce a plurality of RFID tags 120, which in this example will be RFID tags 120*a-e*. In the first work area 1010, the RFID tags 120*a-e* are produced and affixed to WIP items 1001*a-e*. As shown in FIG. 10, the WIP items are in various stages of the manufacturing process. WIP item 1001*a* has just had RFID tag 120*a* physically associated with it and is identified as being present in the first work area 1010 when the RFID tag 120*a* is detected by antenna 170*a*, which is associated with RFID reader 160*b*. RFID reader 160*b* reads RFID 120*a* and communicates to the communications hub 130 that WIP item 1001*a* is located in proximity to antenna 170*a*. Communications hub 130 then relays this information to the cloud-based services device 140.

In the second work area 1020, WIP item 1001*b* is shown as altered by the manufacturing process. The RFID tag 120*b* on the WIP item 1001*b* is detected by the antenna 170*b* and the RFID tag 120*b* is then read by the RFID reader 160*a*. This information may be passed to the cloud-based services device 140 via the communications hub 130 so that the system 100 is notified that WIP item 1001b is in process in the second work area 1020.

In the third work area 1030, WIP items 120c, 120d may be held after completion of processing in the second work area 1020 but before processing in the fourth work area 1040. Presence in the third work area 1030 is determined by the interrogation of the RFID tags 120c, 120d by the antenna 170c and then reading by RFID reader 160b. Status information regarding WIP items 1001c, 1001d is then uploaded to the cloud-based services device 140 via the communications hub 130. In some embodiments, the communications hub 130 may be integrated into one or more RFID readers such that the RFID reader 160 and communications hub 130 are in one physical device.

In the fourth work area 1040, WIP item 120e is currently being processed. The presence of WIP item 1001e is determined by RFID tag 120e being detected by the antenna 170d, and said RFID tag information is then read by the RFID reader 160a, which is uploaded to the cloud-based services device 140 via the communications hub 130.

Throughout the system 1000, the system 100 is tracking and monitoring the movement of all of the WIP items 1001a-e and their status. For example, WIP items 1001c, 1001d may be prioritized within the third work area 1030 such that instructions can be issued by the cloud-based services device 140 as to which of WIP items 1001c, 1001d should be next to be moved to the fourth work area 1040. If a certain WIP item is expected to be in specific work areas, the cloud-based services device 140 may issue one or more notifications to prevent processing from commencing on that work item or its movement into a given work space. For example, if a WIP item 1001c, 1001d should not be advanced to the fourth work area 1040 until the WIP item 1001e has been removed from the fourth work area 1040, then detection of either 1001c, 1001d (via RFID tag 120c, 120d) by the antenna 170d and subsequent reading by RFID reader 160a will trigger a notification to remove the WIP item 1001c, 1001d back to the third work area 1030 or at least not to allow it to remain in the fourth work area 1040.

Likewise, if RFID tag 120b is detected in the second work area 1020 by the antenna 170b and then immediately thereafter detected by the antenna 170d, a notification may be generated because it appears that WIP item 1001b has moved from the second work area 1020 to the fourth work area 1040 and incorrectly bypassed the third work area 1030.

Advanced control rules may be further applied by the cloud services device 140 to manage WIP items more effectively. The example above may be acceptable (moving from the second work area 1020 directly to the fourth work area 1040) if the system 100 includes programming that determines 1) there is available space in the fourth work area 1040 to receive WIP item 1001b (such as WIP item 1001e has already been removed) AND 2) there is no waiting in the third work area 1030 OR WIP item 1001b has a processing priority that exceeds that of WIP items 1001c, 1001d.

While embodiments in the present disclosure have been described in some detail, according to the preferred embodiments illustrated above, it is not meant to be limiting to modifications such as would be obvious to those skilled in the art.

The foregoing disclosure and description of the disclosure are illustrative and explanatory thereof, and various changes in the details of the illustrated apparatus and system, and the construction and the method of operation may be made without departing from the spirit of the disclosure.

What is claimed is:

1. A method of managing RFID devices, the steps comprising:
   requesting a device configuration profile from a cloud-based services device by an RFID device;
   transmitting a message comprising the device configuration profile from the cloud-based services device to the RFID device;
   applying the device configuration profile in the message to the RFID device;
   generating a confirmation message with the RFID device indicating whether the device configuration profile was successfully applied; and
   transmitting the confirmation message to the cloud-based services device.

2. The method of claim 1, further comprising:
   receiving the configuration change request at the cloud-based services device; and
   generating the configuration change with the cloud-based services device.

3. The method of claim 1, wherein the RFID device is one or more of: an RFID printer and an RFID reader.

* * * * *